US008126403B2

(12) United States Patent
Wang Helmersson et al.

(10) Patent No.: US 8,126,403 B2
(45) Date of Patent: Feb. 28, 2012

(54) ESTIMATING AND LIMITING INTER-CELL INTERFERENCE

(75) Inventors: Ke Wang Helmersson, Linköping (SE);
Erik Geijer Lundin, Stockholm (SE);
Fredrik Gunnarsson, Linköping (SE);
Melanie Petren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 617 days.

(21) Appl. No.: 12/192,643

(22) Filed: Aug. 15, 2008

(65) Prior Publication Data

US 2009/0270109 A1  Oct. 29, 2009

Related U.S. Application Data

(60) Provisional application No. 61/047,309, filed on Apr. 23, 2008.

(51) Int. Cl.
*H04B 1/00* (2006.01)
(52) U.S. Cl. ...... 455/63.1; 455/13.4; 455/501; 370/317; 370/318
(58) Field of Classification Search ............ 455/69, 455/442–444, 450, 451, 452.1, 452.2, 453, 455/63.1; 370/328, 331, 332, 341
See application file for complete search history.

(56) References Cited

U.S. PATENT DOCUMENTS

| 5,854,981 | A | 12/1998 | Wallstedt et al. |
| 5,999,811 | A | 12/1999 | Molne |
| 6,754,505 | B1 * | 6/2004 | Baker et al. ................. 455/522 |
| 7,187,934 | B2 | 3/2007 | Turina et al. |
| 7,324,821 | B2 * | 1/2008 | Kwak et al. ................. 455/453 |
| 7,349,504 | B2 * | 3/2008 | Li et al. ......................... 375/346 |
| 7,460,877 | B2 * | 12/2008 | Terry et al. ................... 455/522 |
| 7,483,702 | B2 | 1/2009 | Yeo et al. |
| 7,486,954 | B2 * | 2/2009 | Lee et al. ..................... 455/442 |
| 7,542,451 | B2 | 6/2009 | Cooper et al. |
| 7,577,456 | B2 | 8/2009 | Gunnarsson et al. |
| 7,609,661 | B2 * | 10/2009 | Chae et al. ................... 370/310 |

(Continued)

FOREIGN PATENT DOCUMENTS

EP  1 628 497 A1  2/2006

(Continued)

OTHER PUBLICATIONS

U.S. Appl. No. 11/066,558, filed Feb. 28, 2005; Inventor: Gunnarsson et al.

(Continued)

*Primary Examiner* — Kent Chang
*Assistant Examiner* — Magdi Elhag
(74) *Attorney, Agent, or Firm* — Nixon & Vanderhye P.C.

(57) ABSTRACT

A cellular radio communication system includes a first serving cell and a second non-serving cell. A mobile radio is currently served by a first base station in the first cell. An uplink radio transmission from the mobile radio will cause or causes inter-cell interference in the second non-serving cell. Accordingly, an estimate is made of the inter-cell interference in the second non-serving cell associated with the mobile radio's uplink transmission. If the estimated inter-cell interference in the second non-serving cell exceeds a predetermined threshold, then control is performed so that the inter-cell interference in the second non-serving cell is limited, e.g., by managing radio resources so that the estimated inter-cell interference in the second non-serving cell is or becomes less than the predetermined threshold.

32 Claims, 6 Drawing Sheets

U.S. PATENT DOCUMENTS

| | | | |
|---|---|---|---|
| 7,668,564 B2* | 2/2010 | Onggosanusi et al. | 455/522 |
| 2002/0077113 A1* | 6/2002 | Spaling et al. | 455/453 |
| 2002/0077138 A1* | 6/2002 | Bark et al. | 455/522 |
| 2002/0111180 A1 | 8/2002 | Hogan et al. | |
| 2002/0123348 A1 | 9/2002 | Willars et al. | |
| 2003/0193907 A1* | 10/2003 | Rezaiifar et al. | 370/329 |
| 2004/0022207 A1 | 2/2004 | Leung et al. | |
| 2004/0109424 A1 | 6/2004 | Chheda | |
| 2004/0110524 A1 | 6/2004 | Takano et al. | |
| 2004/0157600 A1 | 8/2004 | Stumpert et al. | |
| 2004/0209624 A1* | 10/2004 | Rune et al. | 455/453 |
| 2005/0043062 A1 | 2/2005 | Ahn et al. | |
| 2006/0128392 A1 | 6/2006 | Turina et al. | |
| 2006/0178112 A1* | 8/2006 | Wigard et al. | 455/67.11 |
| 2006/0194546 A1 | 8/2006 | Gunnarsson et al. | |
| 2006/0251031 A1* | 11/2006 | Anderson et al. | 370/338 |
| 2007/0037577 A1 | 2/2007 | Dalsgaard et al. | |

FOREIGN PATENT DOCUMENTS

| | | |
|---|---|---|
| WO | WO 2006/091172 | 8/2006 |

OTHER PUBLICATIONS

Lundin et al, "Uplink Load Estimation in WCDMA", Report No. LiTH-ISY-R-2458, Automatic Control Communication Systems, Mar. 25, 2002.

Gunnarsson et al., "Uplink Admission Control in WCDMA Based on Relative Load Estimates", Report No. LiTH-ISY-R-2414, Automatic Control Communication Systems, Feb. 22, 2002.

International Search Report for International Application No. PCT/SE2006/050010 dated Jun. 2, 2006.

International Search Report mailed Jul. 10, 2009 in corresponding PCT Application PCT/SE2009/050328.

3GPP TR 25.896 V2.0.0 (Mar. 2004), pp. 1-180.

3GPP TSG-RAN WG2 Meeting #45bis, XP-002370693, Jan. 10-14, 2005, pp. 1-46.

Lundin, Uplink Admission Control Based on Estimated Interference in WCDMA Systems, XP-002532489, Jan. 19, 2001, pp. 1-46.

Office Action mailed Sep. 2, 2010 in co-pending U.S. Appl. No. 11/940,921.

Office Action mailed Feb. 18, 2011 in co-pending U.S. Appl. No. 11/940,921.

Office Action mailed Aug. 31, 2011 in co-pending U.S. Appl. No. 11/940,921.

Ericsson, 3GPP TSG-RAN WG2 #56, Tdoc R2-063305, Reduction of Neighbour Cell List Information Sent to UE, Riga, Latvia, Nov. 6-10, 2006, pp. 1-5.

3GPP TS 25.331 V5.18.0, "3$^{rd}$ Generation Partnership Project; Technical Specification Group Radio Access Network; Radio Resource Control (RRC); Protocol Specification (Release 5)," Sep. 2006.

3GPP TS 25.304 V7.0.0, "3$^{rd}$ Generation Partnership Project; Technical Specification Group Radio Access Network; User Equipment (UE) Procedures in Idle Mode and Procedures for Cell Reselection in Connected Mode (Release 7)," Mar. 2006.

3GPP TS 25.133 V7.5.0, "3$^{rd}$ Generation Partnership Project; Technical Specification Group Radio Access Network; Requirements for Support of Radio Resource Management (FDD) (Release 7)," Oct. 2006.

Ericsson, 3GPP TSG-RAN WG2 #57, T-doc R-070561, "Summary of E-Mail Discussion, Proposal to Remove Neighbour Cell Information in E-UTRA," Feb. 2007.

PCT Written Opinion and International Search Report mailed Apr. 28, 2008 in corresponding PCT Application PCT/SE2007/050847.

* cited by examiner

ESTIMATING AND LIMITING INTER-CELL INTERFERENCE

PRIORITY APPLICATION

This application is claims priority from U.S. provisional patent application Ser. No. 61/047,309, filed on Apr. 23, 2008, entitled "Limiting Inter-Cell Interference By Inter-Cell Interference Control," the contents of which are incorporated herein by reference.

RELATED APPLICATION

This application is related to commonly-assigned U.S. patent application serial number commonly-assigned U.S. patent application Ser. No. 11/066,558, entitled "Using Uplink Relative Path Gain Related Measurements To Support Uplink Resource Management," filed on Feb. 28, 2005, the contents of which are incorporated herein by reference.

TECHNICAL FIELD

The technical field relates to radio communications systems, and more particularly, to limiting inter-cell interference to improve resource management and/or load control.

BACKGROUND

Radio access technologies for cellular mobile networks are continuously being evolved to meet future demands for higher data rates, improved coverage, and capacity. One example is the evolution of the WCDMA access technology to provide High-Speed Packet Access (HSPA). With such evolution to higher data rates, the power contributions of users in neighboring cells, which is called inter-cell interference, becomes more significant. FIG. 1 illustrates an example of a mobile radio (shown as a laptop computer) near a border between cell A and cell B. Base station A serves the mobile radio, and base station B is a non-serving base station relative to the mobile radio. As depicted with two arrows, the uplink transmission from the mobile radio is received at both base stations at about the same signal strength. In cell A, that uplink transmission is a desired signal, but in cell B, it is inter-cell interference that adversely impacts the communications quality, capacity, and throughput in cell B. To maintain communications quality, capacity, and throughput in neighboring cells, efficient and effective inter-cell interference control is needed. Inter-cell interference control is also useful for admission and congestion control as well as resource control and allocation, all of which are generally referred to as resource management.

The total received wideband power at a base station includes background noise power in the base station and the sum of the received power from all transmitting mobiles in serving and non-serving cells. The noise rise is the ratio of the total received wideband power to the background noise power. In the uplink, the common resource shared among the mobile radio terminals is the amount of tolerable interference, i.e., the total received power, or the noise rise at the base station. FIG. 2(a) is a graph of the noise rise in serving and neighboring cells that illustrates the inter-cell interference contributed by a mobile radio near a cell border. The amount of power that each mobile radio contributes to the total received wideband power depends on the data rate and the radio path gain associated with the mobile radio. Hence, the received power from a mobile radio is the uplink transmit power multiplied with the path gain (PG) of the radio link.

FIG. 2(b) graphs the received power in terms of path gain (PG) of the uplink transmission from the mobile radio to the serving and neighboring cell. Just before a new soft handover (SHO) link is established for the mobile connection, the noise rise and power contributions (PG) of the mobile radio increase dramatically (as the mobile gets closer to the adjacent cell) and then decrease when the soft handover (SHO) link is established with the neighboring base station. In this illustration, the maximum data rate for the soft handover example was limited, e.g., to 128 kbps, using a scheduling grant issued by the neighbor base station to the mobile radio as part of the SHO operation, which is one way to limit the inter-cell interference from mobile radios near a cell border.

The more mobile radios transmitting, the more interference, and the higher the uplink load is in that base station's cell. Unfortunately, it is difficult to determine for a neighboring cell the inter-cell interference impact that an uplink mobile transmission from a mobile radio will have that is not served by the base station in that cell. Determining the impact that the mobile's transmission will have on another cell is particularly problematic in decentralized or distributed resource management schemes. Distributed resource control is desirable because it is implemented much "closer" to where the resources are actually used. Given the trend towards high speed downlink and uplink transmission formats, resource management is more decentralized or distributed in order to achieve higher speeds and avoid the considerable signaling (and associated costs) required for centralized control.

Although a centralized resource manager receives information from various cells, which allows informing base stations about mobile connections, conditions, etc., in adjacent cells, a distributed resource manager in a base station, e.g., a scheduler, typically does not have information about other mobile connections it is not supervising/serving. Assume that a high power or high data rate uplink transmission from a mobile station served by a serving base station in a first cell creates significant interference in a nearby non-serving cell managed by a second base station. That interference increases the load in the non-serving cell and effectively consumes resources in the non-serving cell that the non-serving base station would rather use to service mobiles actually within its cell. The non-serving base station itself has no way of directly knowing the inter-cell interference impact that other mobile uplink transmissions will have on its resources or how the inter-cell interference will impact current communications being supported in the non-serving cell. Nor does the serving base station know the contribution its served mobiles' transmissions make to the interference in the non-serving cell.

Scheduling may be used to determine when a certain mobile terminal is allowed to transmit and at what maximum data rate. With scheduling, the base station may influence is the mobile terminal's transport format (e.g., TFC) selection for the uplink transmission, e.g., over an enhanced uplink channel like the E-DCH. Two types of grants may be used: absolute grants and relative grants. Absolute grants set an absolute value of the upper limit of the power the user terminal may use for data transmission. The maximum power allowed for a data transmission determines the maximum data rate for the uplink communication. Relative grants update the resource allocation for a terminal and may assume one of three values: up, down, or hold, to instruct the terminal to increase, decrease, or not change uplink transmitting power based on the amount of radio resources the terminal is currently using. An absolute grant to a user terminal is usually only sent by the cell serving the user terminal, while the relative grants can be transmitted from both serving and non-serving cells.

Because only the mobile radio terminal knows the buffer and power situation at the time of its uplink transmission, (i.e., how much data the mobile needs to be sent and the power needed to do so in a particular time period), the base station scheduler in the serving cell can only send a maximum uplink power limit, e.g., in a scheduling grant, above which the mobile is not allowed to transmit. That limit may be expressed as a specific transport format (e.g., a particular TFC) or as a maximum data rate.

There are problems with trying to control inter-cell interference using a relative grant. First, a relative grant from a non-serving cell is possible only when the mobile radio is in a soft handover, as in the example shown in FIGS. 2(a) and 2(b), because a mobile can only receive a relative grant sent from cells in its active cell set. As a result, a neighbor cell cannot control the interference from mobile radios that are not in soft handover. Second, even if soft handover connections are possible with neighbor cells, it takes time and radio resource control (RRC) signaling to add soft handover links, which should be avoided unless soft handover is warranted for reasons other than inter-cell interference monitoring and control.

What is needed is a way to estimate the inter-cell interference caused by uplink transmissions to the neighboring cells, detect when the estimated inter-cell interference exceeds a threshold, and manage the radio resources in a serving cell to reduce the estimated inter-cell interference so that it is less than the threshold.

SUMMARY

A cellular radio communication system includes a first serving cell and a second non-serving cell. A mobile radio is currently served by a first base station in the first cell. An uplink radio transmission from the mobile radio will cause or causes inter-cell interference in the second non-serving cell. Accordingly, an estimate is made of the inter-cell interference in the second non-serving cell associated with the mobile radio's uplink transmission. If the estimated inter-cell interference in the second non-serving cell exceeds a predetermined threshold, then control is performed so that the inter-cell interference in the second non-serving cell is limited, e.g., by managing radio resources so that the estimated inter-cell interference in the second non-serving cell is or becomes less than the predetermined threshold.

The estimated inter-cell interference in the second non-serving cell may be based on a downlink measurement of a path gain related quantity. The path gain related quantity may be one of the following: a path gain measurement, a received signal power, a received signal code power (RSCP), a common pilot channel (CPICH) received signal code power (RSCP), a received signal power relative interference power, or a common pilot channel (CPICH) received signal power relative interference power.

Several non-limiting example implementations are described. In the first, the mobile radio estimates the inter-cell interference in the second non-serving cell caused by the mobile radio's uplink transmissions. In the second, the first base station estimates the inter-cell interference in the second non-serving cell caused by the mobile radio's uplink transmissions based on information received from the mobile radio. In the third, a network node coupled to the first and second cells estimates the inter-cell interference in the second non-serving cell caused by the mobile radio's uplink transmissions based on information received from the mobile radio. The network node may adapt the predetermined threshold to a load condition in one or more cells monitored by the network node that are neighbor cells to the first cell.

The estimated inter-cell interference in the second non-serving cell may be based on a downlink measurement of a path gain related quantity associated with a signal transmission from a second base station in the second non-serving cell and on an estimate of the mobile radio's transmission power. The estimate of the mobile's radio transmission power is a maximum transmission power of the mobile radio.

In another non-limiting example embodiment, the estimated inter-cell interference in the second non-serving cell is based on a downlink measurement of a relative path gain related quantity for an uplink signal transmission from the mobile radio and a received power of the mobile radio's uplink transmission at the serving base station. The relative path gain related quantity is based on a comparison of a first path gain related quantity for an uplink signal transmission from the mobile radio to the second base station with a second path gain related quantity for the uplink signal transmission from the mobile to the first base station, and an estimate of the received power at the first cell of a signal transmitted from the mobile radio. The mobile radio signals relative path gain measurements to the first base station so that the first base station can estimate the received power of a signal transmitted from the mobile radio.

In one non-limiting example embodiment, the mobile radio determines a maximum uplink transmission power to avoid inducing inter-cell interference in the second non-serving cell that exceeds the predetermined threshold based on an estimated non-serving cell path gain detected by the mobile radio determined using a downlink transmission from the non-serving base station in the second non-serving cell and the predetermined threshold. A lower maximum allowed power may be signaled to the mobile radio using a specific power value, an offset power value, or a decrement signal.

In an example application, the limiting of the inter-cell interference in the second non-serving cell includes determining a transport format for the uplink transmission from the mobile radio that constrains the estimated inter-cell interference in the second non-serving cell to less than the predetermined threshold. The determined transport format is provided to the first base station, and the first base station sends the determined transport format to the mobile radio. Alternatively, the first base station determines the inter-cell interference limiting transport format and sends the determined transport format to the mobile radio.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 3:
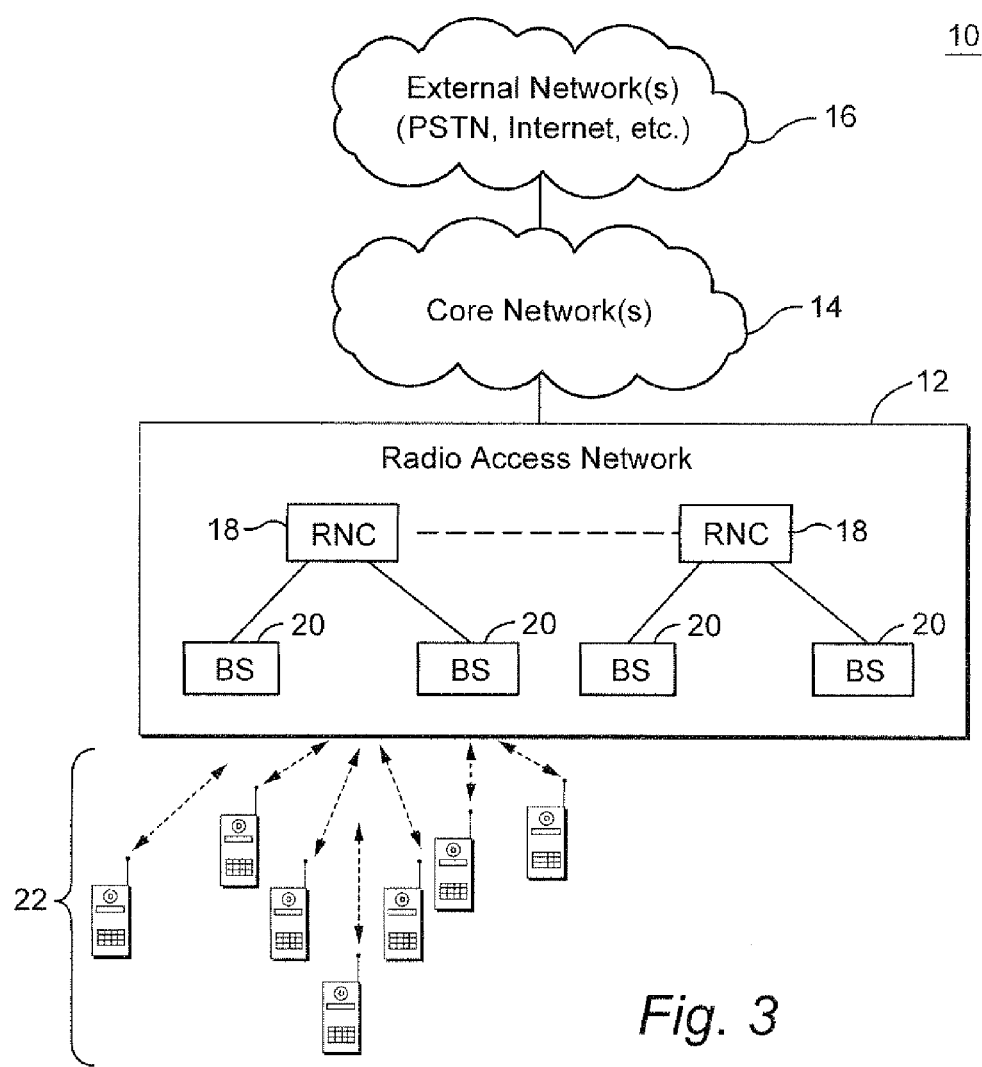
FIG. 3 is a function block diagram of a non-limiting WCDMA example radio communications system.
Figures 2A, 2B:
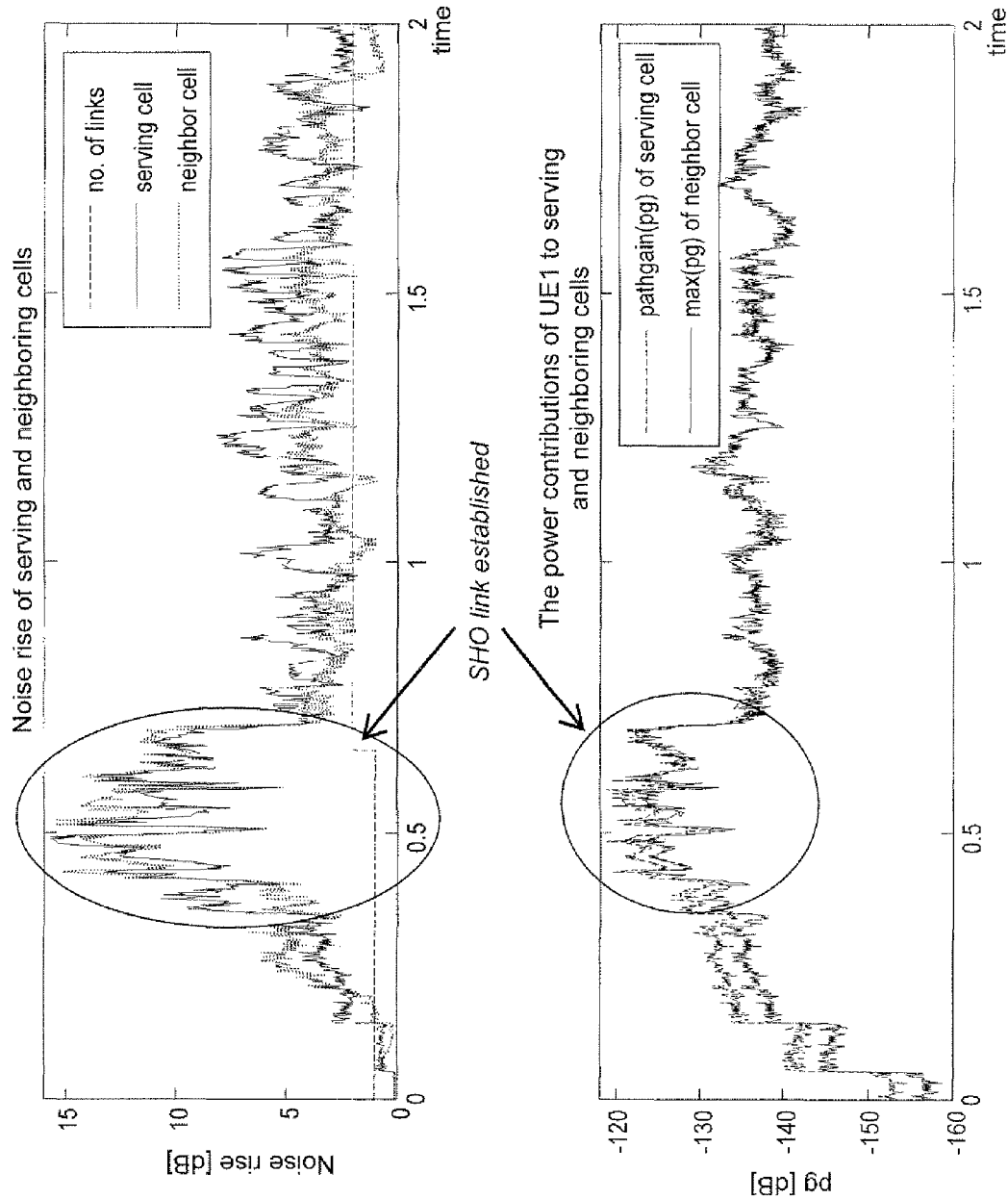
FIGS. 2(a) and 2(b) are a graph illustrating noise rise and power contributions, respectively, of a mobile radio's uplink transmission to a serving and a non-serving neighbor cell.

The technology may be used in any type of cellular communications. For ease of description, the term mobile radio is used and encompasses any kind of radio communications terminal/device like user equipment (UE), PDAs, cell phones, laptops, etc. Two non-limiting examples of modern cellular systems are now described. FIG. 3 is a function block diagram of a non-limiting Third Generation (3G) cellular radio system referred to as a Universal Mobile Telecommunications System (UMTS) operating in Code Division Multiple Access (WCDMA) WCDMA indicated generally by reference numeral 10. A radio access network (RAN) 12 is coupled to one or more core networks 14, which in turn, are coupled to one or more external networks 16, like the Internet, the PSTN, ISDN, etc. The radio access network 12 includes, for example, one or more radio network controllers (RNCs) 18 that may communicate signaling and/or traffic to each other. Each RNC 18 controls one or more radio base stations (BSs) 20. Each base station 20 transmits information over an "air" interface in one or more corresponding coverage areas called cells over a variety of downlink radio channels. Each base station 20 also receives uplink communications over the air interface from mobile radios 22 in or near the base station's cell(s) again using one or more uplink channels.

Figure 1:
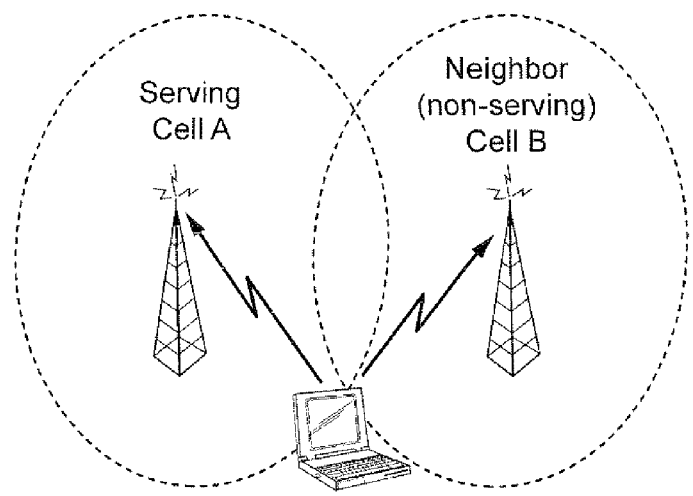
FIG. 1 illustrates a cellular communications system showing inter-cell interference caused by a mobile radio transmitting near a cell border.
Figure 4:
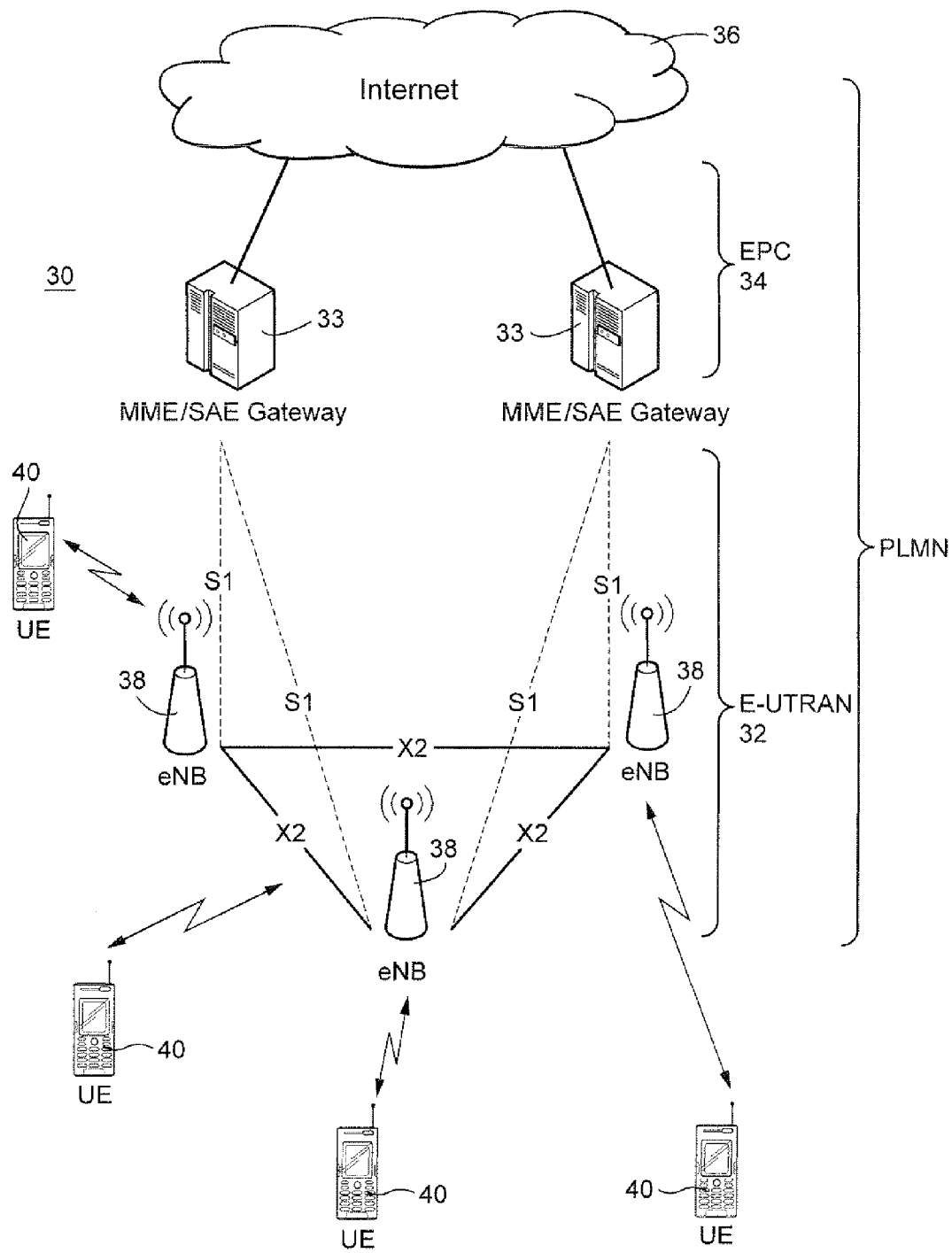
FIG. 4 is a function block diagram of a non-limiting LTE example radio communications system.

FIG. 4 is a function block diagram of a non-limiting LTE example radio communications system 30. An Evolved Universal Terrestrial Radio Access Network (E-UTRAN) 12 includes E-UTRAN NodeBs (eNBs) 38 that provide Evolved Universal Terrestrial Radio Access (E-UTRA) user plane and control plane protocol terminations towards the user equipment (UE) terminals 40 over a radio interface. An eNB is sometimes more generally referred to as a base station, and a UE is sometimes referred to as a mobile radio terminal or a mobile station. As shown in FIG. 1, the base stations are interconnected with each other by an X2 interface. The base stations are also connected by an S1 interface to an Evolved Packet Core (EPC) 34 which includes a Mobility Management Entity (MME) and to a System Architecture Evolution (SAE) Gateway. The MME/SAE Gateway is shown as a single node 33 in this example and is analogous in many ways to an GPRS Support Node (SGSN)/Gateway GPRS Support Node (GGSN) gateway in UMTS and in GSM/EDGE. The S1 interface supports a many-to-many relation between MMEs/SAE Gateways and eNBs. The E-UTRAN 32 and EPC 34 together form a Public Land Mobile Network (PLMN). The MMEs/SAE Gateways 33 are connected to directly or indirectly to the Internet 36 and to other networks.

Figure 5:
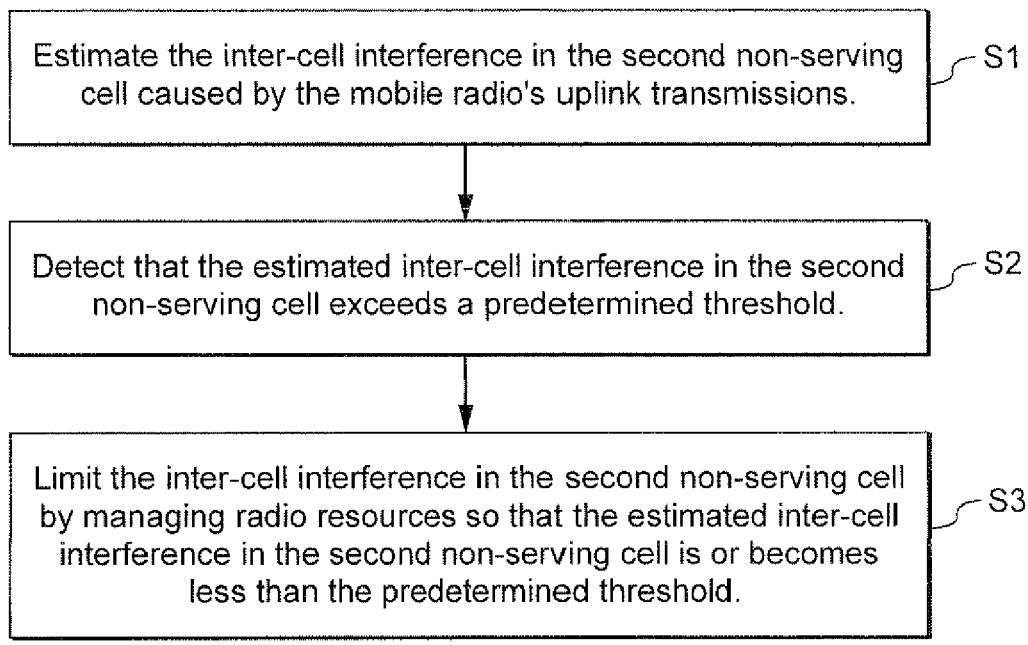
FIG. 5 is a flow chart illustrating example procedures for estimating and limiting inter-cell interference.

FIG. 5 is a flow chart illustrating example procedures for estimating and limiting inter-cell interference. The inter-cell interference in a non-serving cell caused by or that will be caused by a mobile radio's uplink transmission to a serving cell base station is estimated (step S1). The estimated inter-cell interference in the non-serving cell is compared to a predetermined threshold (step S2). If it exceeds the predetermined threshold, the actual or potential inter-cell interference in the non-serving cell is limited or otherwise controlled by managing radio resources so that the estimated inter-cell interference in the non-serving cell is or becomes less than the predetermined threshold (step S3). The reminder of the specification explains various non-limiting example ways and embodiments that may be used to implement each one of these steps.

Figure 6:
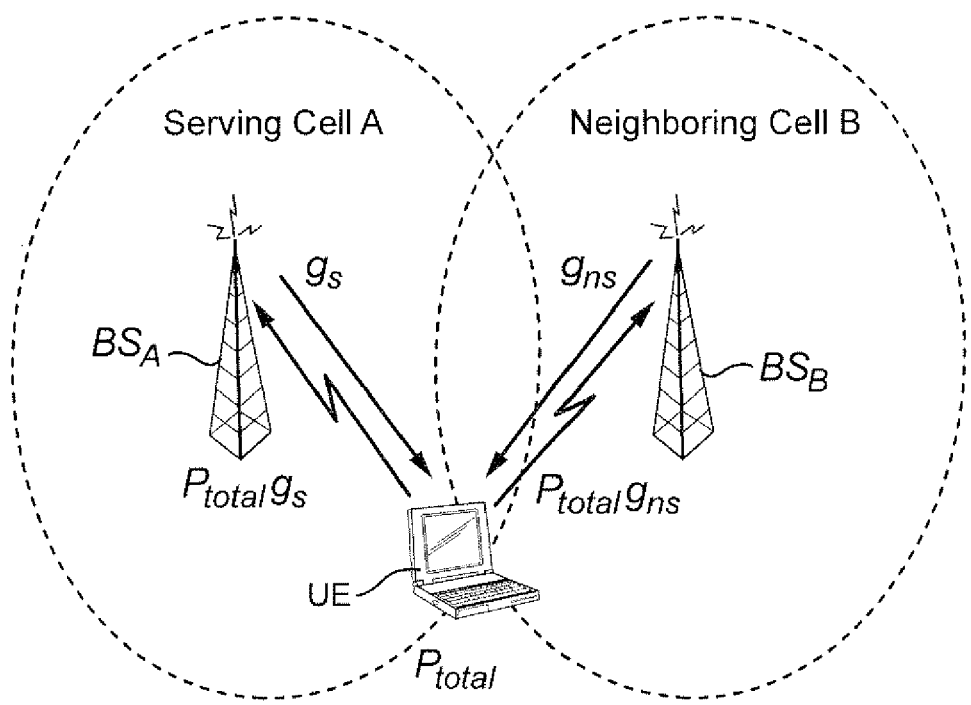
FIG. 6 is a cellular communications system showing inter-cell interference caused by of a mobile radio transmitting near a cell border in terms of path gain and received power from the mobile radio.

One effective parameter for estimating inter-cell interference is path gain (g). FIG. 6 is a cellular communications system showing inter-cell interference caused by a mobile radio (UE) transmitting near a cell border between the mobile's serving cell A and neighboring (non-serving) cell B. The downlink path gain $g_s$ from the serving base station $BS_A$ to the mobile station is $g_s$, and from the non-serving base station $BS_B$ to the mobile station is $g_{ns}$. These are absolute path gains which are distinct from relative path gains (discussed later). Assuming a logarithmic scale, the path gains $g_{ns}$ and $g_s$ may be determined based on a difference between a base station pilot signal strength received by the mobile radio from the non-serving and serving base stations, respectively, and a pilot signal strength at which each base station transmitted its pilot signal.

The inter-cell interference in non-serving cell B caused by the UE's uplink transmission may be estimated from the absolute path gain $g_{ns}$ detected by the mobile from the non-serving base station broadcast transmission combined with the total uplink power $P_{total}$ associated with the mobile radio's uplink transmission. Since the mobile radio knows the total power level of it uplink transmission and can detect the downlink path gain from the non-serving base station, the mobile radio can estimate the inter-cell interference in neighboring cell B without having to perform any control signaling with the radio network. Assuming the mobile radio or is provided with knows the maximum inter-cell interference limit, the mobile then compares that limit with the estimated inter-cell interference, and if the limit is exceeded, the mobile radio reduces its transmit power level, preferably until the limit is no longer exceeded.

Figure 7:
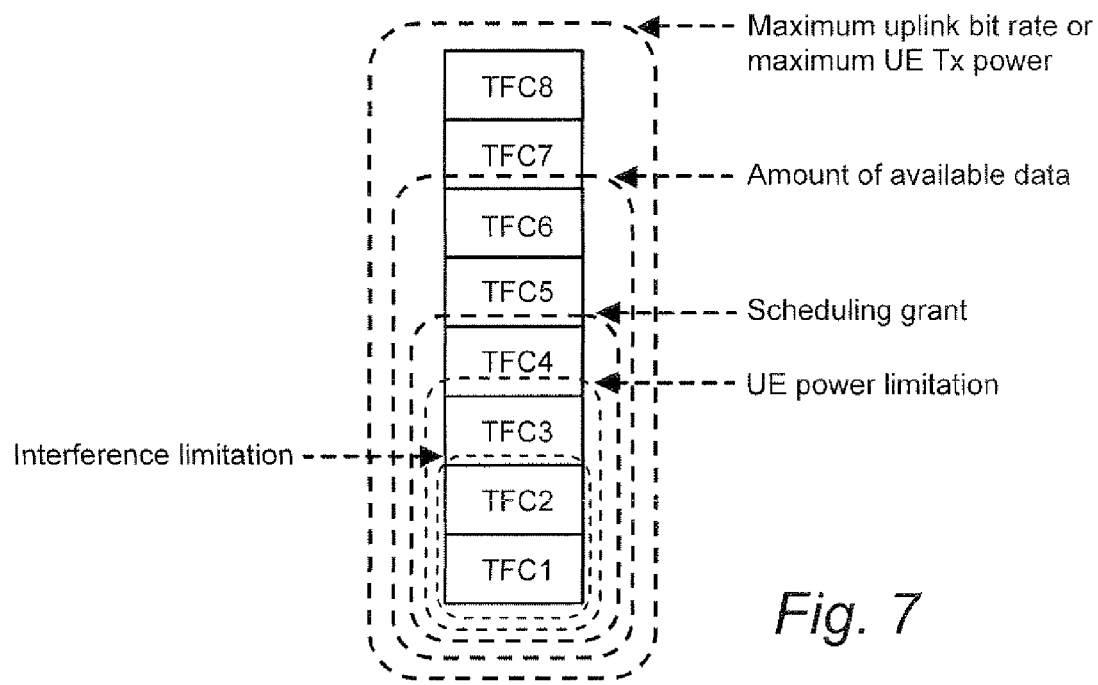
FIG. 7 illustrates a transmit format combination selection process for uplink transmission constrained by inter-cell interference control.

Another way to control inter-cell interference from the mobile radio is to regulate the allowed transport format selected for the mobile radio for uplink transmissions. This is illustrated in FIG. 7 which shows a stack of transport format combination (TFC) values 1-8, where increasing TFC values correspond to increasing uplink transmit power levels and higher uplink data rates. In an enhanced uplink transmission example context, the absolute maximum bit rate that a base station scheduler can use to schedule a mobile's uplink transmission is established by a network node. That absolute maximum bit rate is shown in FIG. 7 as just above TFC 8. For example, the RNC in FIG. 3 or the MME/SAE gateway in FIG. 4 may establish the absolute maximum bit rate. That maximum bit rate is related to the maximum uplink power that a mobile radio can transmit with.

The base station scheduler also regulates the maximum bit rate for a specific mobile radio transmission (which is often less than the maximum absolute bit rate permitted) based on the momentary traffic demand and cell load situation by issuing a scheduling grant identifying that maximum bit rate. The base station scheduler typically only controls the uplink transmissions of mobile radios currently being served by that base station. In FIG. 7, even though the mobile radio currently has sufficient data to transmit to justify a data rate corresponding to TFC 6, the base station scheduling grant only permits a TFC 4, which means the mobile must transmit the data at a lower power/data rate then desired. Based on the inter-cell interference estimation associated with the uplink transmission from mobile radio that impacts a non-serving neighboring cell, an even lower TFC value of TFC 2 is used if the inter-cell interference estimate exceeds the predetermined inter-cell interference limit. That interference limit may be a pre-defined system or cell parameter, or it can be calculated from some other cell parameter(s) or variable(s), such as the maximum noise rise and background noise level. If signaling from the noon-serving cell exists, such as a signal like a relative grant from non-serving cell, a dynamically adjustable inter-cell interference limit may be used. The inter-cell interference limit can be adaptively adjusted based on, e.g., the non-serving cell load. If the non-serving cell experiences interference and needs to limit the inter-cell interference of the mobile radio uplink transmission quickly, the non-serving cell can decrease the limit. If non-serving cell can tolerate the interference from the mobile radio, e.g., the non-serving cell is not serving any or many mobiles, then there is no need to limit the interference. In that kind of situation, the non-serving cell can relax the limit or allow the mobile radio to transmit without the limit.

In one non-limiting example, the inter-cell interference control action can be combined with a TFC selection process where the mobile radio selects the TFC given a mobile radio transmit power constraint and an inter-cell interference limitation. In FIG. 7, the mobile radio would select the min{TFC2,TFC3}. The data rate of the mobile radio can also be limited by the scheduler where the scheduler considers both the scheduling grant and inter-cell interference limitation. In FIG. 7, the base station then chooses the min{TFC2, TFC4}. A network node, like an RNC coupled to the base station, can also limit the mobile radio's data rate by choosing the lower of the uplink maximum bit rate and the inter-cell interference limitation constraint, which in the example in FIG. 7, is the min{TFC2,TFC8}. The network node can also limit the maximum unlink transmission power of the mobile by the inter-cell interference constraint, which in the example in FIG. 7, is to calculate the maximum mobile transmission power that is needed for the selection of TFC2. In all of these implementations, the lower TFC2 is selected in order to bring or maintain the inter-cell interference below the threshold value.

The inter-cell interference threshold limit can be expressed in terms of maximum allowed inter-cell interference or power contribution, $C_{max}$, to a neighboring cell. Inter-cell interference control may be triggered when the inter-cell interference generated by the user exceeds a predetermined interference limit or threshold $C_{max}$:

$$C_{ns} = P_{total} g_{ns} > C_{max} \quad (1)$$

Alternatively, the trigger may be expressed in terms of a maximum allowed difference $\delta_{max}$ between the path gain for a non-serving neighboring cell and the path gain for the serving cell. In this case, inter-cell interference control may be triggered when the path gain of a neighboring cell gets close to the path gain of serving cell:

$$g_{ns} + \delta_{max} > g_s \quad (2)$$

(while the neighboring cell is not in active set). Much of the discussion below assumes the use of equation (1) simply for ease of description.

In one non-limiting example embodiment, the total mobile radio transmission power can be expressed as $P_{total} = (1+\Delta) P_{dpcch}$, where $P_{dpcch}$ is power used for a dedicated control channel (DPCCH), and $\Delta$ is the power offset for the uplink data transmission by the mobile scheduled on an enhanced-DCH channel (E-DCH). Based on the inter-cell interference limit $C_{max}$ and the DPCCH power contribution to a non-serving (NS) neighbor cell $P_{dpcch} g_{ns}$, a maximum power offset $\Delta_{interference}$ for E-DCH transmission can be calculated as:

$$\Delta_{interference} = \frac{C_{max}}{P_{dpcch} g_{ns}} - 1 \quad (3)$$

Let $\Delta_{power}$ be the maximum power offset in accordance with an E-TFC selection procedure, e.g., see FIG. 7, and let the scheduling grant expressed in terms of power offset be $\Delta_{grant}$. The power offset $\Delta$ used by the mobile radio should satisfy the following:

$$\Delta = \min \{\Delta_{power}, \Delta_{grant}, \Delta_{interface}\} \quad (4)$$

If a data rate or transmission power offset for E-DCH data transmission by the mobile radio is limited by the interference limit $\Delta_{interference}$, then the mobile radio either should not request a greater data rate, or if the mobile does, the base station scheduler should ignore it.

In a mobile-based example embodiment, the inter-cell interference of a mobile radio transmission to a neighboring cell can be estimated directly by the mobile radio terminal. As described above in conjunction with FIG. 6, the mobile radio knows the total transmission power to be used for an uplink transmission, e.g., for a selected E-TFC, denoted as $P_{total}$. The mobile radio also makes downlink path gain measurements from signals broadcast by the serving cell and by monitored non-serving neighbor cells, e.g., pilot signals. Let $g_s$ be the estimated path gain from serving cell and $g_{ns}$ be the highest path gain from monitored non-serving cells. The inter-cell interference C to the serving cell is estimated by $C_s = P_{total} g_s$, and to neighboring cells is estimated by $C_{ns} = P_{total} g_{ns}$. The estimation of path gain can take individual cell offsets into consideration in case uplink and downlink transmissions are unbalanced. The unbalance in uplink and downlink transmissions may be because some base stations being equipped with one or more Tower Mounted Amplifiers (TMAs). There are feeder losses in both the uplink and downlink in TMA arrangements. In the uplink, the TMA is used to compensate the uplink feeder loss. The downlink feeder loss typically is not compensated and may cause the uplink and downlink to be unbalanced. Because the mobile's total uplink transmit power $P_{total}$ and the path gains $g_{ns}$ and $g_s$ are available at the mobile radio terminal, and assuming the mobile radio knows $C_{max}$ or $\delta_{max}$, the mobile radio has all the information needed to make the inter-cell interference-comparisons in either equations (1) and (2), respectively, to perform inter-cell interference control.

Figure 8:
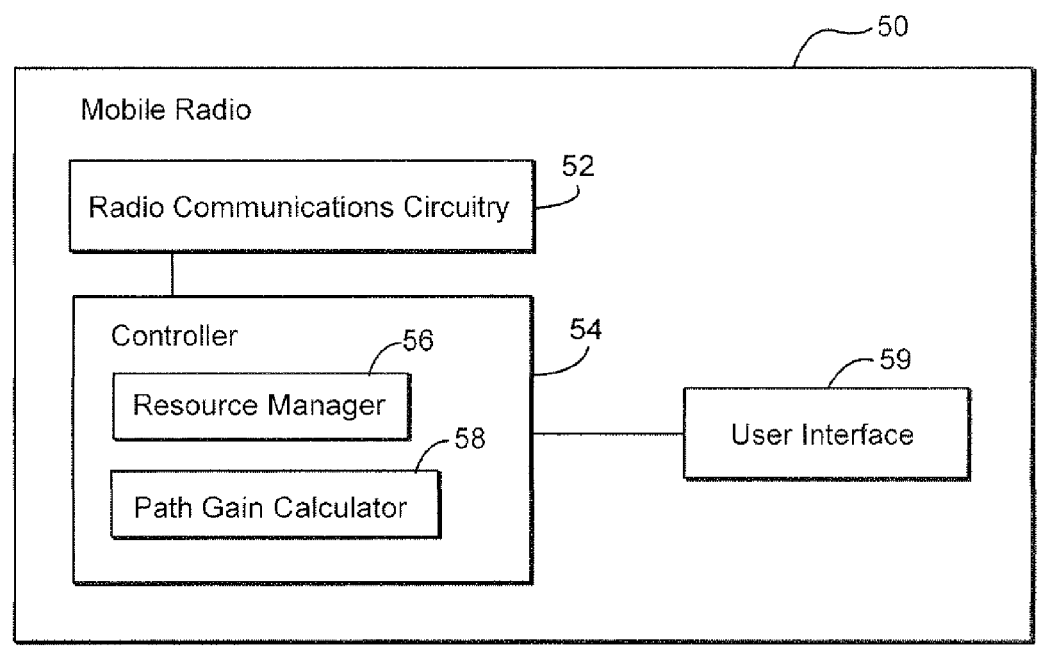
FIG. 8 illustrates a function block diagram of a mobile station that may be used in a non-limiting, example embodiment for estimating and controlling inter-cell interference.

FIG. 8 illustrates a function block diagram of a mobile station that may be used in the above non-limiting, example embodiment. Mobile radio 50 includes radio communications circuitry 52 coupled to a controller 54. The controller 54 is also coupled to a user interface 59 (coupled to a speaker, microphone, keypad, touchpad, or display, etc.) for communication with a user. The radio communications circuitry 50 receives base station pilot signals and/or other downlink signals from base stations from which or that includes the transmission power at which the signal was transmitted by its base station and provides those power values to a path gain calculator 58. In addition to determining absolute path gain values for monitored base stations, the path gain calculator 58 may be used to determine relative path gains for used by the base station in the base station-based embodiment described below. Uplink relative path gains may be determined using downlink path gain values and making the assumption that the uplink path gain is approximately the same as the downlink path gain. The path gain calculator 58 determines an uplink path gain for each base station may be determined by subtracting the received signal strength of its own pilot signal from that pilot signal's actual transmission power in logarithmic power units. Alternatively, the path gain uplink path gain to each base station by dividing the received pilot signal strength by its actual transmission power in linear power units.

The controller 54 further includes a resource manager 56 that manages uplink resources based on path gain. As already described, the mobile radio compares the estimated inter-cell interference with a threshold value, and if the threshold is exceeded, the mobile radio decreases the resources (e.g., power, data rate, etc.) used for the uplink signal transmission.

In the serving base station based example embodiment, some signaling is required since neither the mobile's inter-cell interference nor the path gain for neighboring cells is available at the serving base station. Three non-limiting example signaling alternatives are now described. In the first alternative, the mobile radio simply reports to the serving base station the mobile's inter-cell interference to neighboring cells. It is enough to report the highest power contribution to the neighboring cells, $\hat{C}_{ns}=P_{total}g_{ns}$. The mobile's report can be either periodic or event-triggered. In a second alternative, the mobile radio signals a "relative" path gain, $g_{ns}/g_s$, calculated by the path gain calculator 58, as described above, to the serving base station. The serving base station can then estimate the inter-cell interference generated by the mobile's uplink transmission based on the relative path gain $g_{ns}/g_s$ and the received uplink power contribution from the mobile radio at the serving base station, $C_s = P_{total}g_s$, as follows:

$$\hat{C}_{ns} = P_{total} \cdot g_{ns}/g_s \cdot g_s = C_s \cdot g_{ns}/g_s \quad (5)$$

A third alternative is to signal the base station whenever inter-cell interference control is triggered either from the mobile radio if the estimation of inter-cell interference is done at the mobile terminal or from a network node like an RNC if the estimation of inter-cell interference is done the network node.

If the serving base station is informed of the inter-cell interference from the mobile radio transmission to the non-serving neighboring cell, $\hat{C}_{ns}=P_{total}g_{ns}$, via uplink signaling from the mobile, then the base station can trigger inter-cell interference control whenever the estimated or signaled inter-cell interference of the user exceeds the interference limit $C_{max}$:

$$\hat{C}_{ns} > C_{max} \quad (6)$$

The serving base station can also trigger inter-cell interference control based on the relative path gain, $g_{ns}/g_s$, if the relative path gain is signaled from the mobile radio to the base station. Inter-cell interference control may be triggered when the relative path gain is close to 1, or when $g_{ns}+\delta_{max}>g_s$ in dB scale.

Figure 9:
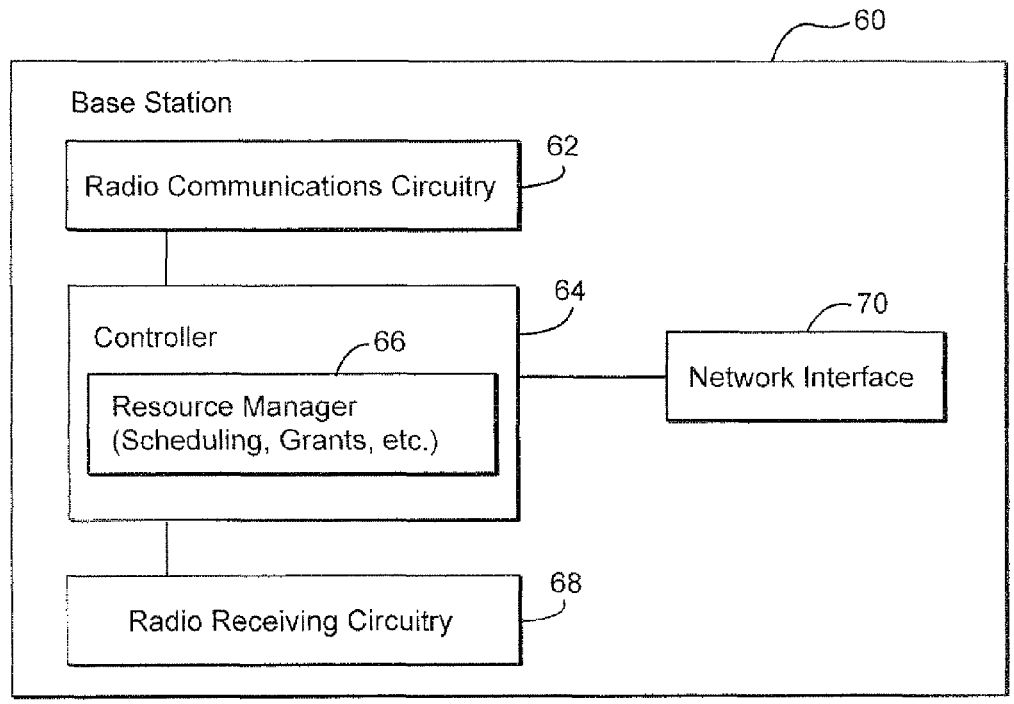
FIG. 9 illustrates a function block diagram of a base station that may be used in a non-limiting, example embodiment for estimating and controlling inter-cell interference.

FIG. 9 illustrates a function block diagram of a base station 60 that may be used in the base station-based, non-limiting, example embodiment. The base station 60 includes radio communications circuitry 62 coupled to a controller 64. The controller 64 is also coupled to a network interface 70 for communication with the rest of the radio network. The controller includes a resource manager 66 that receives from the mobile radio relative path gain data or relative path gain measurement data from which relative path gain can be calculated. As described above, the resource manager 66 manages uplink resources using that relative path gain and received uplink power from the mobile radio to determine an estimated inter-cell interference which is then compared with a threshold value. If the threshold is exceeded, then the base station signals to the mobile station to decrease transmission power, data rate, TFC, etc. used for the uplink signal transmission.

A non-limiting network node based embodiment is now described, assuming for illustration purposes only, that the network node is an RNC. Recognizing that the inter-cell interference, $C_{ns}=P_{total}g_{ns}$, estimated at the mobile radio terminal is not available at RNC, three non-limiting example alternatives for RNC to estimate the inter-cell interference of the mobile radio are described. First, uplink signaling from the mobile radio to RNC simply reports the inter-cell interference to one or more neighboring cells determined by the mobile radio. It is enough for the mobile radio to report the highest inter-cell interference, $\hat{C}_{ns}=P_{total}g_{ns}$, to the neighboring cell. The report provided to the RNC via the serving base station can be either periodic or event-triggered.

Figure 10:
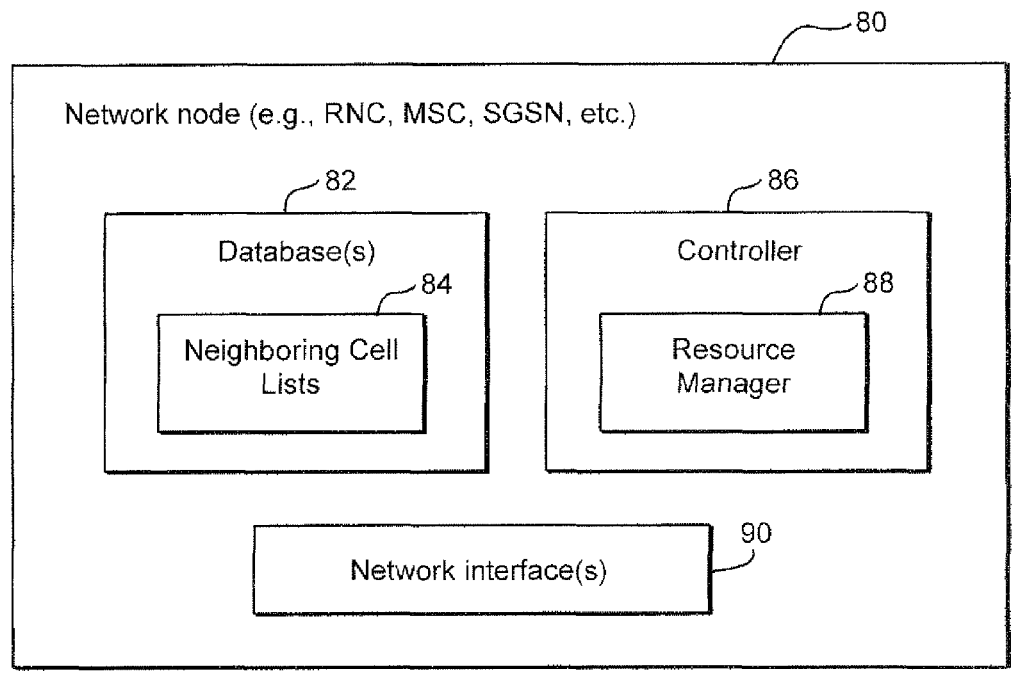
FIG. 10 illustrates a function block diagram of a network controller that may be used in a non-limiting, example embodiment for estimating and controlling inter-cell interference.

FIG. 10 illustrates a function block diagram of a network node 80 that may be used in the network node-based, non-limiting, example embodiment. The network node to described above was an RNC, but other example nodes could be a base station controller (BSC), a mobile switching center (MSC), a serving GPRS support node (SSGN), a gateway GPRS support node (GGSN), or an MME gateway. The network node 80 may include one or more databases 82 for storing information reported from mobile stations or determined from reported information. One example is neighbor cells list information. The database(s) is(are) coupled to a controller 86. The controller 86 is also coupled to a network interface 70 for communication with the radio and often other networks. The controller 86 includes a resource manager 88 that receives from the mobile radio one or more reports such as inter-cell interference reports as just described. The resource manager 86 compares the estimated inter-cell interference with a threshold value, and if the threshold is exceeded, then the resource manager signals to the mobile station either directly or via the serving base station to decrease transmission power, data rate, TFC, etc. used for the uplink signal transmission.

In a second alternative, the mobile radio reports its path gain measurements to serving and non-serving base stations to the network nodes resource manager 86. Based on the path gain measurement reports, the resource manager 86 estimates a path gain $\hat{g}_s$ of the serving base station and a highest path gain $\hat{g}_{ns}$ of monitored non-serving cells for the mobile radio. The inter-cell interference generated by the mobile is then determined based on the relative path gain, i.e., a difference of these two path gains $\hat{g}_{ns}-\hat{g}_s$ assuming a logarithmic scale. A third alternative is based on the mobile radio reporting a noise rise measurement of the serving cell and neighboring cells to the resource manager 86 in addition to the normal path gain measurement report. From that information, the resource manager 86 estimates a noise rise of the most interfered neighboring cell and combines the estimated noise rise level together with the relative path gain estimation $\hat{g}_{ns}-\hat{g}_s$ to calculate the inter-cell interference generated by the mobile radio.

The resource manager 86 can trigger inter-cell inference control based on such signaling measurement reports from the mobile radio and the serving base station. Some example alternatives are now described that depend on the signaling alternative employed and availability of the measurement reports. If an inter-cell inference report, $\hat{C}_{ns}$, is provided to the resource manager 86, the resource manager 86 may trigger inter-cell interference control when that reported inter-cell inference from the mobile radio exceeds an inter-cell interference threshold limit $C_{max}$, which is the condition in equation (6). If mobile radio's inter-cell inference to neighbor cells is not reported to the resource manager 86, the resource manager 86 can trigger inter-cell interference control based on path gain measurement reports provided by mobile radios. In this case, the resource manager 86 can trigger inter-cell interference control if, $$\hat{g}_{ns} > \hat{g}_s - \delta_{max} \tag{8}$$

while the neighboring cell is not in active set. Moreover, if the resource manager 86 can estimate the noise rise of the serving cell, $\eta_s$, and the noise rise of non-serving cell, $\eta_{ns}$, based on a noise rise measurement report from the base station, together with the path gain estimation of the serving cell, $\hat{g}_s$, and the path gain estimation of the highest non-serving cells, $\hat{g}_{ns}$, the RNC can trigger inter-cell interference control based on satisfaction of the conditions in equations (9) and (10):

$$\begin{cases} \hat{g}_{ns} > \hat{g}_s - \delta_{max} \\ \eta_{ns} > \eta_{max} \end{cases} \tag{9}$$

$$\begin{cases} \hat{g}_{ns} > \hat{g}_s - \delta_{max} \\ \eta_{ns} > \eta_s - \delta_{nr} \end{cases} \tag{10}$$

where $\eta_{max}$ is the maximum allowed noise rise level in a cell and $\delta_{nr}$ can be a margin of noise rise between serving cell and non-serving cell. Both $\eta_{max}$ and $\delta_{nr}$ can be defined as cell or system parameters.

In the context of the resource manager 86 controlling the inter-cell interference by adjusting the maximum uplink transmission power, two non-limiting example procedures to calculate the new maximum uplink transmission power are now described. For the first procedure, a new maximum mobile radio uplink transmission power is set according to:

$$P_{tx,max} = \min\left\{\frac{C_{max}}{\hat{g}_{ns}}, P_{max}\right\} \tag{11}$$

when the inter-cell interference control is triggered. Equation (11) includes $P_{max}$ which is the maximum transmission power normally used by mobile terminal and $P_{tx,max}$ which is a new maximum mobile transmission power when inter-cell interference control is triggered. The new maximum mobile transmission power reduces the maximum transmission power normally used by mobile radio thereby reducing the inter-cell interference. Hence, the relation between them is $P_{tx,max} < P_{max}$.

After triggering inter-cell interference control, the interference situation may change, not only because of reducing the mobile's maximum transmission power, but also because of the changes in the radio environment. If the neighboring cells are no longer interfered with, then the inter-cell inference control should be released and the mobile's maximum transmission power reset to the maximum transmission power normally used, i.e., $P_{max}$. To avoid large oscillations when the maximum UE transmission power is changing, the mobile's maximum transmission power may be reset in a stepwise manner in accordance with:

$$P_{tx,max} = \min\{P_{tx,max} + \delta_p, P_{max}\} \tag{12}$$

A parameter $\delta_p$ adjusts the step size when the power is reset. A smaller step may be used to avoid excessive oscillation.

In the second procedure, when inter-cell interference control is triggered, the maximum mobile transmission power is decreased stepwise, with a predefined step size $\delta_{down}$ as given in:

$$P_{tx,max} = \min\{P_{tx,max} - \delta_{down}, P_{max}\} \tag{13}$$

Similar to the first procedure, the mobile's maximum transmission power is reset if a neighboring cell is no longer interfered with by increasing the mobile's maximum transmission power by a predefined step size $\delta_{up}$:

$$P_{tx,max} = \min\{P_{tx,max} + \delta_{up}, P_{max}\} \tag{14}$$

The network node 80 can also control the inter-cell interference via the serving base station. The network node signals either a new uplink maximum bit rate or an indicator to reduce the maximum uplink bit rate to the base station. Such a new uplink maximum bit rate can be calculated based on the following non-limiting example procedure. If inter-cell interference is triggered, then a new maximum uplink transmission power $P_{tx,max}$ is calculated, e.g., using one of the examples described above. Based on this maximum transmit power, a maximum power offset for uplink data transmission can be estimated as:

$$\Delta_{ed,max} = \frac{P_{tx,max}}{\hat{P}_{DPCCH}} - 1 - \Delta_{ec} \tag{15}$$

where $\hat{P}_{DPCCH}$ is an estimation of the mobile's uplink transmission power on a control channel DPCCH. It can be estimated based on the mobile's power measurement report. $\Delta_{ec}$ is power offset for an uplink E-DPCCH transmission. To reset the maximum uplink bit rate when the so neighboring cell is no longer interfered, the network node either resets the maximum uplink bit rate to the default system parameter or increases it stepwise with a predefined step until a default uplink maximum bit rate is reached.

As explained, triggering inter-cell interference control is based on the inter-cell interference limit or threshold. Several non-limiting example alternatives for determining the interference limit or threshold are described. The interference limit can be either a static parameter or a dynamic variable. The interference limit can be a pre-defined system parameter in terms of the maximum allowed power contribution, $C_{max}$, to neighboring cells. The interference limit can be a pre-defined system parameter in terms of the maximum allowed path gain difference $\delta_{max}$ between the serving cell and neighboring cell. The interference limit can also be a pre-defined cell parameter, either in terms of the maximum allowed power contribution, $C_{max}$, to neighboring cells, or in terms of the maximum allowed path gain difference, $\delta_{max}$, between the serving cell and neighboring cell. It can be calculated based on the background noise level of a cell, $N_0$, together with the existing parameters such as $$C_{max} = \frac{N_0(\eta_{max} - 1)}{\delta_{sho}} \quad (16)$$

where $\eta_{max}$ is the maximum noise rise level, and $\delta_{sho}$ can be a soft handover threshold (SHO), both in the linear scale, or $$C_{max} = L_{max} \cdot \eta_{max} \cdot N_0 \quad (17)$$

where $\eta_{max}$ is the maximum noise rise level, and $L_{max}$ is the maximum allowed cell load, both in the linear scale.

The inter-cell interference limit, $C_{max}$, may also be a cell-specific parameter which accounts for example different cells being equipped with a different tower mounted amplifier (TMAs) and/or different receivers. The TMA compensation for uplink feeder loss impacts the accuracy of the estimated path gain used for inter-cell interference control. Given that TMA compensation can be cell-specific, the inter-cell interference limit, $C_{max}$, may also be cell-specific. The impact of TMA differences can be encoded in the $C_{max}$ value since the TMA differences are known in the RNC or other network node. Another example for using a cell-specific inter-cell interference limit relates to receiver equipment. The non-serving cell may be equipped with a G-RAKE+ receiver with the capability to suppress some inter-cell interference. The impact of inter-cell interference for a base station equipped with a G-RAKE receiver may not be as large as it would be for a base station without a G-RAKE receiver. Hence, the threshold to trigger the inter-cell interference should be different to account for such differences. These differences could be encoded in cell individual offset (CIO), or encoded in the cell individual interference limit, $C_{max}$, value, since the impact of the G-RAKE+ receiver differences are usually known in the RNC or other network node.

The inter-cell interference limit $C_{max}$ can be set dynamically if signaling from the non-serving cell exists, e.g., a signal similar to relative grant from non-serving cells when the mobile radio is in soft handover. In that case, $C_{max}$ can be adaptively adjusted based on the non-serving cell load. If the non-serving cell is interfered with by the mobile radio and needs to limit the inter-cell interference of the mobile radio uplink transmission quickly, the non-serving cell can decrease the interference limit $C_{max}$. If a non-serving cell is not adversely affected by the interference from the mobile radio, then the non-serving cell can relax the limit or allow the mobile radio to transmit without the limit.

The technology estimates, and when necessary, limits inter-cell interference. As described using various non-limiting examples, the inter-cell interference estimation and control can be implemented in many different ways depending on signaling possibilities and other factors. The technology does not require the mobile radio to be in soft handover, and inter-cell interference can be controlled quickly and before soft handover. Accurate and efficient inter-cell interference estimation and control improves the throughput of the neighboring cell and the serving cell. If a desired bit rate for a mobile radio contributing too high an inter-cell interference, limiting the data rate for that mobile station allows the serving cell scheduler to schedule the freed-up radio resources to another user in the cell, thereby increasing overall cell throughout. The technology increases gain in the system throughput but and manages the noise rise level so that the system is stable. Moreover, uplink control channel, e.g., a DPCCH, power consumption is reduced because less inter-cell interference means less control power is needed for control channel messages.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for use in a cellular radio communication system that includes a first serving cell and a second non-serving cell, where a mobile radio is currently served by a first base station in the first cell and uplink radio transmissions from the mobile radio causes inter-cell interference in the second non-serving cell, comprising:
   (a) a communications node estimating the inter-cell interference in the second non-serving cell caused by the mobile radio's uplink transmissions from an absolute path gain associated with the mobile radio and the second non-serving cell combined with a total uplink power associated with the mobile radio's uplink transmissions;
   (b) detecting that the estimated inter-cell interference in the second non-serving cell exceeds a predetermined threshold; and
   (c) limiting the inter-cell interference in the second non-serving cell by managing radio resources so that the estimated inter-cell interference in the second non-serving cell is or becomes less than the predetermined threshold.

2. The method in claim 1, wherein the estimated inter-cell interference in the second non-serving cell is based on a downlink measurement of a path gain related quantity.

3. The method in claim 2, wherein the path gain related quantity is one of the following: a path gain measurement, a received signal power, a received signal code power (RSCP), a common pilot channel (CPICH) received signal code power (RSCP), a received signal power relative interference power, or a common pilot channel (CPICH) received signal power relative interference power.

4. The method in claim 1, wherein the communications node is the mobile radio which estimates the inter-cell interference in the second non-serving cell caused by the mobile radio's uplink transmissions.

5. The method in claim 1, wherein the communications node is the first base station which estimates the inter-cell interference in the second non-serving cell caused by the mobile radio's uplink transmissions based on information received from the mobile radio.

6. The method in claim 1, wherein the communications node is a network node coupled to the first and second cells which estimates the inter-cell interference in the second non-serving cell caused by the mobile radio's uplink transmissions based on information received from the mobile radio.

7. The method in claim 6, wherein the network node adapts the predetermined threshold to a load condition in the second non-serving cell.

8. The method in claim 4, wherein a network node coupled to the first and second cells adapts the predetermined threshold to a load condition in one or more cells monitored by the network node that are neighbor cells to the first cell and the mobile radio uses the adapted threshold in performing steps (a)-(c).

9. The method in claim 5, wherein a network node coupled to the first and second cells adapts the predetermined threshold to a load condition in one or more cells monitored by the network node that are neighbor cells to the first cell and the base station uses the adapted threshold in performing steps (a)-(c).

10. The method in claim 1, wherein the mobile radio determines a maximum uplink transmission power to avoid inducing inter-cell interference in the second non-serving cell that exceeds the predetermined threshold based on an estimated non-serving cell path gain detected by the mobile radio based on a downlink transmission from a non-serving base station in the second non-serving cell and the predetermined threshold.

11. The method in claim 1, wherein the estimated inter-cell interference in the second non-serving cell is based on a downlink measurement of a path gain related quantity associated with a signal transmission from a second base station in the second non-serving cell and on an estimate of the mobile radio's transmission power.

12. The method in claim 11, wherein the mobile radio signals path gain measurements to the first base station or to a network node coupled to the first and second cells.

13. The method in claim 11, wherein the estimate of the mobile's radio transmission power is a maximum transmission power of the mobile radio.

14. The method in claim 1, wherein the limiting step (c) includes determining a transport format for the uplink transmission from the mobile radio that limits the estimated inter-cell interference in the second non-serving cell to less than the predetermined threshold.

15. The method in claim 14, wherein the first base station determines the inter-cell interference limiting transport format and sends the determined transport format to the mobile radio.

16. The method in claim 14, wherein the determined transport format is provided to the first base station and the first base station sends the determined transport format to the mobile radio.

17. The method in claim 1, wherein the limiting step (c) includes signaling to the mobile radio a lower maximum allowed power using a power value, an offset power value, or a decrement signal.

18. Apparatus for use in a cellular radio communication system that includes a first serving cell and a second non-serving cell, where a mobile radio is currently served by a first base station in the first cell and uplink radio transmissions from the mobile radio causes inter-cell interference in the second non-serving cell, comprising electronic circuitry configured to:
estimate the inter-cell interference in the second non-serving cell caused by the mobile radio's uplink transmissions from an absolute path gain associated with the mobile radio and the second non-serving cell combined with a total uplink power associated with the mobile radio's uplink transmissions;
detect that the estimated inter-cell interference in the second non-serving cell exceeds a predetermined threshold; and
limit the inter-cell interference in the second non-serving cell by managing radio resources so that the estimated inter-cell interference in the second non-serving cell is or becomes less than the predetermined threshold.

19. The apparatus in claim 18, wherein the estimated inter-cell interference in the second non-serving cell is based on a downlink measurement of a path gain related quantity.

20. The apparatus in claim 19, wherein the path gain related quantity is one of the following: a path gain measurement, a received signal power, a received signal code power (RSCP), a common pilot channel (CPICH) received signal code power (RSCP), a received signal power relative interference power, or a common pilot channel (CPICH) received signal power relative interference power.

21. The apparatus in claim 18, wherein the mobile radio includes circuitry configured to estimate the inter-cell interference in the second non-serving cell caused by the mobile radio's uplink transmissions.

22. The apparatus in claim 18, wherein the first base station includes circuitry configured to estimate the inter-cell interference in the second non-serving cell caused by the mobile radio's uplink transmissions based on information received from the mobile radio.

23. The apparatus in claim 18, wherein a network node coupled to the first and second cells includes circuitry configured to estimate the inter-cell interference in the second non-serving cell caused by the mobile radio's uplink transmissions based on information received from the mobile radio.

24. The apparatus in claim 23, wherein the network node circuitry is configured to adapt the predetermined threshold to a load condition in one or more cells monitored by the network node that are neighbor cells to the first cell.

25. The apparatus in claim 18, wherein the mobile radio circuitry is configured to determine a maximum uplink transmission power to avoid inducing inter-cell interference in the second non-serving cell that exceeds the predetermined threshold based on an estimated non-serving cell path gain detected by the mobile radio based on a downlink transmission from a non-serving base station in the second non-serving cell and the predetermined threshold.

26. The apparatus in claim 18, wherein the estimated inter-cell interference in the second non-serving cell is based on a downlink measurement of a path gain related quantity associated with a signal transmission from a second base station in the second non-serving cell and on an estimate of the mobile radio's transmission power.

27. The apparatus in claim 26, wherein the mobile radio is configured to signal path gain measurements to the first base station or to a network node coupled to the first and second cells.

28. The apparatus in claim 26, wherein the estimate of the mobile's radio transmission power is a maximum transmission power of the mobile radio.

29. The apparatus in claim 18, wherein the electronic circuitry is configured to determine a transport format for the uplink transmission from the mobile radio that limits the estimated inter-cell interference in the second non-serving cell to less than the predetermined threshold.

30. The apparatus in claim 29, wherein the first base station includes circuitry configured to determine the inter-cell interference limiting transport format and sends the determined transport format to the mobile radio.

31. The apparatus in claim 29, wherein the first base station is configured to receive the determined transport format and send the received transport format to the mobile radio.

32. The apparatus in claim 18, wherein mobile radio is configured to receive signaling including a lower maximum allowed power using a power value, an offset power value, or a decrement signal.

* * * * *

UNITED STATES PATENT AND TRADEMARK OFFICE
CERTIFICATE OF CORRECTION

PATENT NO. : 8,126,403 B2
APPLICATION NO. : 12/192643
DATED : February 28, 2012
INVENTOR(S) : Wang Helmersson et al.

It is certified that error appears in the above-identified patent and that said Letters Patent is hereby corrected as shown below:

In Column 2, Line 51, delete "influence is" and insert -- influence --, therefor.

In Column 6, Line 6, delete "an GPRS" and insert -- a GPRS --, therefor.

In Column 7, Line 28, delete "noon-serving" and insert -- non-serving --, therefor.

In Column 7, Line 55, delete "unlink" and insert -- uplink --, therefor.

In Column 8, Line 33, delete "$\Delta_{interface}$" and insert -- $\Delta_{interference}$ --, therefor.

In Column 10, Lines 39-40, delete "node to described" and insert -- node described --, therefor.

In Column 10, Line 42, delete "(SSGN)," and insert -- (SGSN), --, therefor.

In Column 11, Line 26, delete "if," and insert -- if: --, therefor.

In Column 12, Line 50, delete "$\Delta_{\theta C}$" and insert -- $\Delta_{ec}$ --, therefor.

In Column 12, Line 52, delete "the so neighboring" and insert -- the neighboring --, therefor.

In Column 13, Line 22, delete "(TMAs)" and insert -- (TMA) --, therefor.

In Column 13, Line 31, delete "G-RAKE+" and insert -- G-RAKE --, therefor.

In Column 13, Line 40, delete "G-RAKE+" and insert -- G-RAKE --, therefor.

Signed and Sealed this
Fourth Day of September, 2012

David J. Kappos
*Director of the United States Patent and Trademark Office*